US008845195B2

(12) United States Patent
Gaisser

(10) Patent No.: US 8,845,195 B2
(45) Date of Patent: Sep. 30, 2014

(54) HYDRAULIC MACHINE HAVING A SLIDING BEARING HAVING A BEARING ELEMENT

(75) Inventor: Gerd Gaisser, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/613,949

(22) Filed: Sep. 13, 2012

(65) Prior Publication Data

US 2013/0251295 A1 Sep. 26, 2013

(30) Foreign Application Priority Data

Sep. 15, 2011 (DE) ........................ 10 2011 113 530

(51) Int. Cl.

*F16C 17/08* (2006.01)
*F16C 33/02* (2006.01)
*F16C 17/10* (2006.01)
*F03C 1/06* (2006.01)
*F04B 1/12* (2006.01)
*F16C 23/04* (2006.01)
*F04B 1/20* (2006.01)

(52) U.S. Cl.

CPC ............... *F16C 17/10* (2013.01); *F03C 1/0644* (2013.01); *F04B 1/122* (2013.01); *F16C 23/04* (2013.01); *F04B 1/2014* (2013.01)

USPC ........... 384/215; 384/275; 384/276; 384/296; 417/269

(58) Field of Classification Search

CPC ........ F04B 1/122; F01B 3/005; F04D 1/2014; F04D 13/026; F16C 23/04; F16C 17/10

USPC ................. 384/121, 129, 215, 415–416, 465, 384/275–275, 296; 417/269, 439; 418/55, 418/137

See application file for complete search history.

(56) References Cited

U.S. PATENT DOCUMENTS

| | | | | | |
|---|---|---|---|---|---|
| 463,416 | A | * | 11/1891 | Lubricator | 384/415 |
| 862,051 | A | * | 7/1907 | Chayton | 384/416 |
| 888,824 | A | * | 5/1908 | Knudsen | 384/465 |
| 900,859 | A | * | 10/1908 | Johnson | 384/416 |
| 2,684,273 | A | * | 7/1954 | Fears et al. | 384/415 |
| 3,018,146 | A | * | 1/1962 | Euwe et al. | 384/299 |
| 3,552,886 | A | * | 1/1971 | Olson, Jr. | 417/269 |
| 3,859,885 | A | * | 1/1975 | Hayashida | 384/300 |
| 4,828,024 | A | * | 5/1989 | Roche | 166/84.4 |
| 5,033,875 | A | * | 7/1991 | Moulinet | 384/582 |

(Continued)

FOREIGN PATENT DOCUMENTS

| | | |
|---|---|---|
| DE | 923 631 | 2/1955 |
| DE | 102 20 610 A1 | 8/2003 |

(Continued)

*Primary Examiner* — Marcus Charles

(74) *Attorney, Agent, or Firm* — Maginot, Moore & Beck

(57) ABSTRACT

A bearing element for a sliding bearing is configured to support a drive shaft of a hydraulic machine. The bearing element is connected to the drive shaft so as to prevent relative rotation and has an outer annular surface configured to provide sliding support. A supporting web is formed between a location at which the bearing element is fixed to the drive shaft and the outer annular surface. The supporting web is elastically deformable to compensate for deflection of the drive shaft and/or an alignment error of sliding bearings of the drive shaft. A sliding bearing has a bearing element of this kind, and a hydraulic machine has at least one sliding bearing of this kind.

15 Claims, 4 Drawing Sheets

(56) References Cited

U.S. PATENT DOCUMENTS

| | | | | | |
|---|---|---|---|---|---|
| 5,393,204 | A * | 2/1995 | Kawahara | 417/269 |
| 5,669,718 | A * | 9/1997 | Sakairi et al. | 384/215 |
| 5,813,768 | A * | 9/1998 | Lyon | 384/192 |
| 5,853,260 | A * | 12/1998 | Curbillon et al. | 384/215 |
| 7,670,054 | B2 * | 3/2010 | Fedotov et al. | 384/192 |
| 2003/0118259 | A1 * | 6/2003 | Denner et al. | 384/416 |

FOREIGN PATENT DOCUMENTS

| | | | | |
|---|---|---|---|---|
| DE | 103 00 070 | A1 | 6/2004 | |
| DE | 10 2007 018 794 | A1 | 10/2008 | |
| GB | 1287830 | A * | 12/1996 | F01B 3/00 |
| JP | 09217675 | A * | 8/1997 | F04B 1/20 |

* cited by examiner

HYDRAULIC MACHINE HAVING A SLIDING BEARING HAVING A BEARING ELEMENT

CROSS REFERENCE TO RELATED APPLICATION

This application claims priority under 35 U.S.C. §119 to patent application no. DE 10 2011 113 530.1, filed on Sep. 15, 2011 in Germany, the disclosure of which is incorporated herein by reference in its entirety.

BACKGROUND

The disclosure relates to a bearing element, to a sliding bearing having a bearing element of this kind configured to support a drive shaft of a hydraulic machine, and to a hydraulic machine having a sliding bearing of this kind.

Publication DE 103 00 070 A1 has disclosed a hydraulic machine in the form of an axial piston machine of swashplate construction. This machine has a drive shaft connected to a drive mechanism. Said drive shaft is supported in the radial and axial directions in a machine housing by two rolling contact bearings arranged in an X configuration. During the operation of the axial piston machine, the asymmetric driving forces from the drive mechanism acting on the drive shaft lead to deflection of the drive shaft. This leads to extremely non-uniform loading of the rolling contact bearings and, as a result, these exhibit relatively high wear, leading in turn to a relatively short service life and shorter maintenance intervals. Moreover, with rolling contact bearings of this kind there is essentially no possibility of compensating for an alignment error of the bearings, where said bearings are arranged offset relative to a longitudinal axis of the drive shaft, and this likewise leads to higher wear of the rolling contact bearings due to asymmetric loads.

Document DE 102 20 610 B4 discloses an axial piston machine having a drive shaft which, on the one hand, is provided with rolling support via a rolling contact bearing and, on the other hand, is provided with sliding support via a spherical bearing. The spherical bearing has an inner bearing sleeve, rigidly connected to the drive shaft and has an outer cylindrical surface as a sliding surface. The bearing sleeve slides in a cylindrical inner circumferential surface of an annular element arranged so as to prevent relative rotation, which has an outer circumferential surface of convex cross section. The annular element, in turn, is supported by its outer circumferential surface of convex configuration in a further outer annular element with an inner circumferential surface of concave configuration. The annular element is supported such that it is pivotable about a pivoting axis extending radially relative to the longitudinal axis of the drive shaft. The further annular element is fixed in a machine housing. A pin projecting from the outer circumferential surface of the inner annular element is provided to connect the pivotable inner annular element to the outer annular element so as to prevent relative rotation. Said pin projects into an elongate hole formed in the outer annular element. A longitudinal axis of the elongate hole extends in the direction of the longitudinal axis of the drive shaft. Deflection of the drive shaft is compensated for by virtue of the pivotable inner annular element of the spherical bearing. The disadvantage here is that the spherical bearing has extremely complex configuration in terms of device engineering and requires a large amount of installation space.

German Patent 923 631 discloses a shaft supported by two sliding bearings, wherein the sliding bearings allow for compensation of deflection of the shaft. In this case, one embodiment of a sliding bearing has a ring-shaped diaphragm-like bearing element. An annular groove is introduced into the inner annular surface of the bearing element, thereby forming two mutually spaced annular webs, which are securely connected to a sliding bush. The shaft is guided in a rotatable and axially movable manner in the latter. An outer surface of the diaphragm-like bearing element is convex in cross section and is guided in a sliding and pivotable manner in a correspondingly concave inner circumferential surface of a machine housing. Deflection of the shaft is compensated for, on the one hand, by deformation of the diaphragm-like bearing element and, on the other hand, by pivoting of the bearing element relative to the machine housing. The extreme complexity of the sliding bearing in terms of device engineering is likewise a disadvantage here. Another disadvantage is the fact that, in the event of deformation of the bearing element, power flows between the bearing element and the sliding bush via the annular webs, giving rise to high stresses in the region of the annular webs. These can disadvantageously lead to deformation of the annular webs and this, in turn, can result in release of the connection between the bearing element and the sliding bush. Moreover, the sliding bearings in this publication also require a large amount of installation space and are relatively difficult to assemble, due to the spherical outer circumference of the bearing elements.

Document DE 10 2007 018 794 A1 shows a sliding bearing for a shaft. In this case, an elastically deformable ring-shaped bearing element is provided. Said bearing element has an L-shaped cross section and has a wide outer cylindrical surface and a narrow inner cylindrical surface. The bearing element is rigidly connected to the shaft via the narrow inner cylindrical surface. The bearing element is arranged in a sliding manner in a bearing bush rigidly connected to a housing via the outer cylindrical surface which serves as a sliding surface. In this case, deflection of the shaft is compensated for by elastic deformation of the bearing element, although the deformation of the bearing element disadvantageously has the effect that the outer cylindrical surface, i.e. the sliding surface of the bearing element, is severely deformed, with the result that the sliding bearing is subject to comparatively high wear.

Faced with this situation, it is the underlying object of the disclosure to provide a bearing element, a sliding bearing and a hydraulic machine which are of simple and low-cost construction in terms of device engineering and have low wear.

This object is achieved by a bearing element, by a sliding bearing and by a hydraulic machine as described below.

SUMMARY

According to the disclosure, a bearing element used for a sliding bearing configured to support a drive shaft of a hydraulic machine has an inner annular surface configured to connect to the drive shaft so as to prevent relative rotation. Here, the inner annular surface is configured, in particular, as a cylindrical surface. An outer annular surface of the bearing element, which is likewise configured, in particular, as a cylindrical surface, serves as a radial sliding surface. The bearing element is supported rotatably and in a sliding manner by said surface in a bearing receptacle, which is, in particular, a bearing bush arranged in a machine housing of the hydraulic machine. The annular surfaces are connected by an elastically deformable supporting web. In this case, said supporting web is configured such that, in the event of deflection of the drive shaft and/or of an alignment error—which occurs when a plurality of sliding bearings for a drive shaft are arranged offset relative to the drive shaft axis, e.g. in a machine housing—it is essentially the supporting web of the bearing element which is elastically deformable to compensate for the deflection of the shaft and/or for the alignment error.

This solution has the advantage that, in the event of deflection of the drive shaft and/or of an alignment error, it is not the annular surfaces but essentially only the supporting web which is elastically deformed, thereby enabling the outer annular surface to continue to slide in the bearing bush with a large supporting surface and with an improved or substantially the same supporting pressure as compared with the prior art. By virtue of the advantageous arrangement of the radial sliding surface on the outer circumference of the bearing element, an angular velocity between the bearing bush and the radial sliding surface is significantly higher than with an arrangement of the radial sliding surface between the drive shaft and the bearing element. This has the effect that hydrodynamic sliding support between the bearing element and the bearing bush is improved since static friction and/or mixed friction can be overcome at a comparatively low speed.

It is advantageous that the supporting web has a ring-shaped configuration, thereby ensuring that substantially uniform stress distribution prevails in the bearing element during the operation of the hydraulic machine as the drive shaft rotates. In addition, the annular surfaces have a cylindrical configuration. Moreover, the supporting web is arranged eccentrically relative to the bearing element.

In another embodiment, the bearing element is integrally configured, which is simple in terms of device engineering. Here, the supporting web is formed by an annular recess introduced into the end of the bearing element, between the annular surfaces.

One advantageous possibility is to use a face of the bearing element facing away from the annular recess at least partially as an axial sliding surface, thereby enabling use of the bearing element as a sliding bearing for axial and radial support.

The annular recess preferably has an approximately conical or frustoconical cross section. In this case, the cross section extends along a section plane in which the longitudinal axis of the sliding bearing lies. In this case, the cross section of the annular recess tapers in the direction of the face facing away from the annular recess. As a result, two sleeve sections which widen in the direction of the supporting ring are formed in the bearing element. The widening of the sleeve sections is matched substantially to a stress profile in the bearing element of stresses which occur during the use of the bearing element. It is possible in general for the greatest stresses to prevail in the region of the supporting element, for which reason it is advantageous that the sleeve sections are widest in cross section at this point.

The outer sleeve section or sleeve-shaped outer section formed by the annular recess introduced into the bearing element has the outer annular surface. The axial sliding surface is then preferably configured as a circular ring-shaped surface section extending substantially on the end of the sleeve-shaped outer section. In this case, it is possible for the axial sliding surface to be arranged substantially outside the region of the supporting web, as a result of which elastic deformation of the web then has virtually no effect on support in the axial direction.

To secure a bearing bush axially, a radial projection is formed on the outer annular surface of the bearing element as a supporting shoulder for said bearing bush.

The radial projection is preferably formed in the region of an annular face of the sleeve-shaped outer section.

The sleeve-shaped inner section formed by the annular recess next to the sleeve-shaped outer section has an annular face for support on the drive shaft in the direction of the longitudinal axis thereof.

To ensure large-area and uniform transmission of bending forces between the drive shaft and the bearing element due to deflection of the shaft, the inner annular surface of the bearing element is comparatively wide when viewed in the axial direction. In this case, the width of the inner annular surface is preferably greater than that of the outer annular surface.

In the no-load state, the face of the bearing element facing away from the annular recess preferably extends substantially perpendicularly to the axial direction.

However, it is also conceivable to make this face a conical or a spherical surface to obtain a larger axial bearing surface.

According to the disclosure, a sliding bearing has a bearing element according to the disclosure. As a result, this sliding bearing has extremely low wear in the event of deflection of the shaft and/or an alignment error and thus has a long service life. The sliding bearing additionally has a bearing bush and a thrust washer, for example. A sliding bearing of this kind is used instead of conventional rolling contact bearings for example, in particular in a hydraulic machine.

A hydraulic machine according to the disclosure, which is, in particular, an axial piston machine with a swashplate construction, e.g. an axial piston pump, has a drive shaft supported in a machine housing. In this case, at least one sliding bearing according to the disclosure is used for support. This leads to a hydraulic machine which, in terms of device engineering, is of extremely simple construction in respect of the support thereof in terms of device engineering and has low wear, thus allowing comparatively long maintenance intervals.

It is advantageous that a bearing bush is arranged in a bearing recess in the machine housing of the hydraulic machine to accommodate the bearing element of the sliding bearing. A thrust washer, which interacts with the axial sliding surface of the bearing element, is furthermore arranged in said bearing recess, in particular on the recess bottom.

The drive shaft of the hydraulic machine is preferably supported by two sliding bearings according to the disclosure, with a drive mechanism of the hydraulic machine arranged substantially between the sliding bearings.

The hydraulic machine is preferably operated with an HF liquid, in particular an HFC liquid. The HFC liquid is, in particular, a liquid of low flammability based on a solution of polymers (polyglycols) in water in a ratio of about 60:40.

Other advantageous developments of the disclosure are the subject matter of further description below.

BRIEF DESCRIPTION OF THE DRAWINGS

The disclosure is explained in greater detail below with reference to schematic drawings, in which.

DETAILED DESCRIPTION

Figure 1:
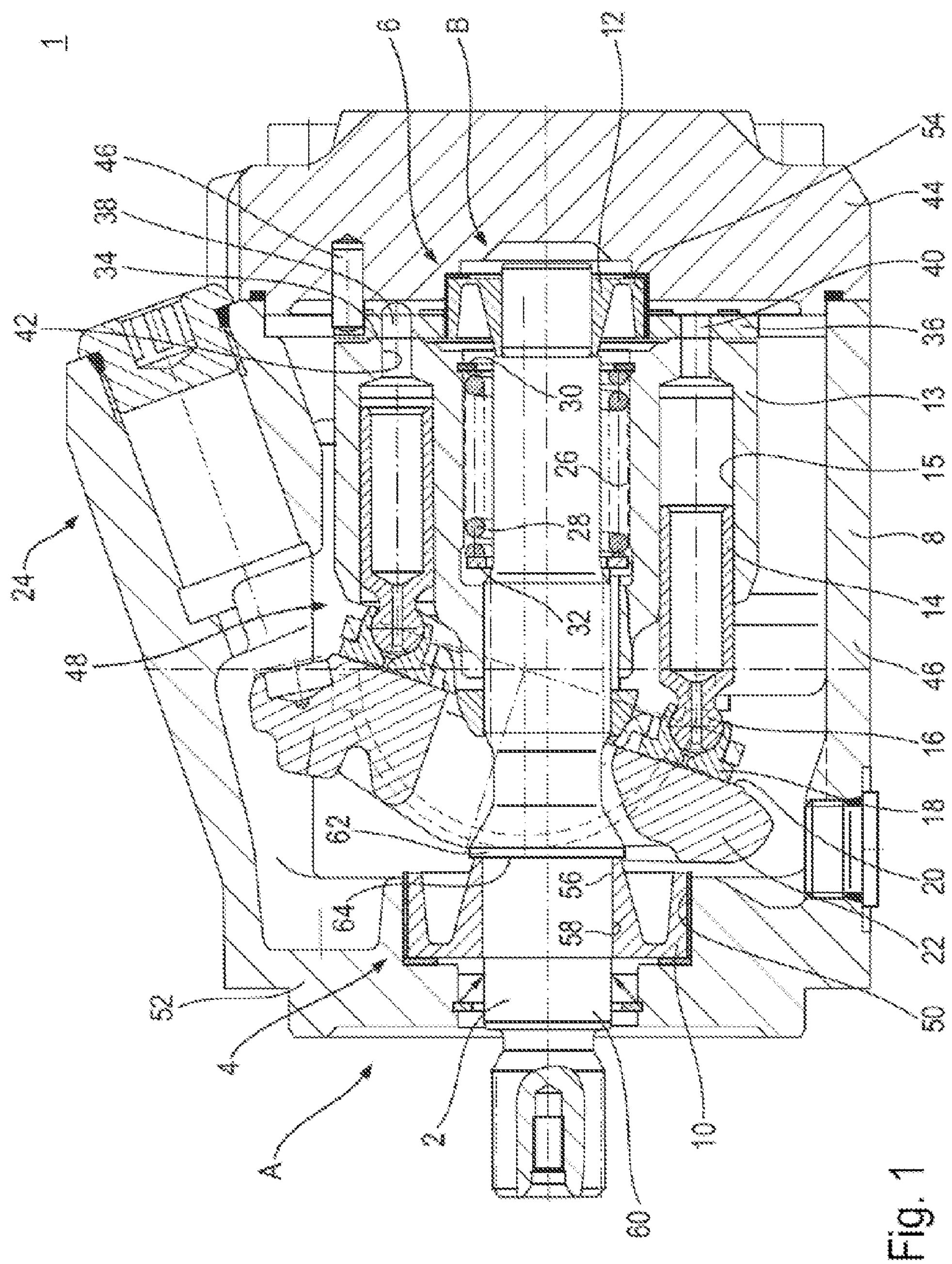
FIG. 1 shows, in a longitudinal section, a simplified representation of an axial piston machine having sliding bearings, which have bearing elements in accordance with a first illustrative embodiment.

The axial piston machine shown in FIG. 1 is an axial piston machine, in particular an axial piston pump with a swashplate construction, which is designated as the A10 VO 45 by the applicant and is also operated using HFC liquids. Said machine has a drive shaft 2, in particular a drive shaft designated as the A10 by the applicant, which is provided with sliding support in a machine housing 8 of the hydraulic machine 1 by two sliding bearings 4 and 6. The sliding bearings 4 and 6 have respective bearing elements 10 and 12, which compensate for deflections of the drive shaft and alignment errors of the sliding bearings 4 and 6.

A cylinder drum 13 is arranged on the slidingly supported drive shaft 2, between the sliding bearings 4 and 6 when viewed in the axial direction. Said cylinder drum is penetrated by the drive shaft 2, and the cylinder drum 13 and the drive shaft 2 are connected so as to prevent relative rotation. The cylinder drum 13 has a plurality of cylinder bores 15, which extend approximately parallel to a longitudinal axis of the drive shaft 2. There is a piston 14 guided in a sliding manner in each cylinder bore 15. Each piston has a spherical head 16 at the end facing away from the cylinder drum 13. Together with a sliding shoe 18, said head 16 forms a ball joint, in which the head 16 is accommodated in a corresponding recess in the sliding shoe 18. Via the sliding shoes 18, the pistons 14 are supported on a sliding surface 20 of a swashplate 22, wherein the swashplate 22 is pivotable about a pivoting axis extending perpendicularly to the plane of the drawing in FIG. 1 with an adjusting device (not illustrated in FIG. 1). In particular, the adjusting device (not illustrated) is arranged in an oblique bore 24 in the machine housing 8. Due to the support of the pistons 14 on the swashplate 22, they perform a reciprocating motion when the cylinder drum 13 rotates. The extent of this reciprocating motion is predetermined by the position of the swashplate 22.

A cylindrical recess 26 is provided in the cylinder drum 13, extending along a center line of the cylinder drum 13 and having a larger diameter than the drive shaft 2 in this region. As a result, a spring space is formed between the drive shaft 2 and the recess 26. A compression spring 28 is arranged in the spring space. In this arrangement, said spring is clamped between a first spring support 30, which is arranged on the cylinder drum 13, and a second spring support 32, which is arranged on the drive shaft 2. the face 34 of the cylinder drum 13 is clamped via the compression spring 28 in a sealing manner against a control plate 36 with the spring support 30.

Formed in the control plane 36 are control openings 38 and 40, which are connected on the side thereof facing away from the cylinder drum 13 with at least one high pressure and one low pressure connection. The cylinder bores 15 each open towards the face 34 of the cylinder drum 13 via a through bore 42, which extends approximately coaxially with the center line of said cylinder bores. During a rotation of the cylinder drum 13, the control openings 40 sweep over a sealing area around the control plate 36 and, during one revolution, are connected alternately to the control openings 38 and 40, respectively, of the high pressure and low pressure connections of the hydraulic machine. In the axial direction, the control plate 36 is supported on a housing cover 44 of the machine housing 8 and is fixed on the housing cover 44 with a locating pin 46 so as to prevent rotation. The housing cover 44 serves to close off a pot-shaped housing part 46 of the machine housing 8 in which the drive mechanism 48 of the hydraulic machine 1 is arranged.

The drive shaft 2 is supported in a radial and in an axial direction in the machine housing 8 by the sliding bearings 4 and 6. The sliding bearing 4 on the left in FIG. 1 is arranged in a bearing recess 50 in a housing bottom 52 of the pot-shaped housing part 46, while the right-hand sliding bearing 6 is arranged in a bearing recess 54 in the housing cover 44 and in the control plate 36. The bearing recess 50 for the sliding bearing 4 is configured as a blind bore which is introduced from the inside of the machine housing 8 and the center line of which extends approximately coaxially with the center line of the drive shaft 2. A through bore, which has a diameter smaller than the bearing recess 50 and through which the drive shaft 2 is passed, is introduced into a bore bottom of the bearing recess 50. Appropriate sealing mechanisms are arranged between the drive shaft 2 and the machine housing 8 in the region of the through bore. In this case, the bearing recess 54 for sliding bearing 6 is configured as a through bore in the control plate 36 and as a blind bore in the housing cover 44, the bores having substantially the same diameter.

The bearing element 10 of sliding bearing 4 on the left in the figure has an approximately circular-cylindrical inner annular surface 56, which is connected rigidly to an outer circumferential surface 58 of the drive shaft 2, e.g. with an interference fit. Said outer circumferential surface has a circular-cylindrical cross section. The outer surface 58 of the drive shaft 2 has substantially the same area as the annular surface 56 and is bounded in the longitudinal direction by two steps 60, 62 on the drive shaft 2. The section of the drive shaft 2 comprising the outer surface 58 has a larger diameter than step 60 and a smaller diameter than step 62. An annular face 64 facing in the direction of bearing element 10 is formed by step 62 on the drive shaft 2. The bearing element 10 is supported axially on the annular face 64. To provide a better illustration, a detail of the hydraulic machine 1 in the region of sliding bearing 4 thereof is illustrated on an enlarged scale in the following FIG. 2.

Figure 2:
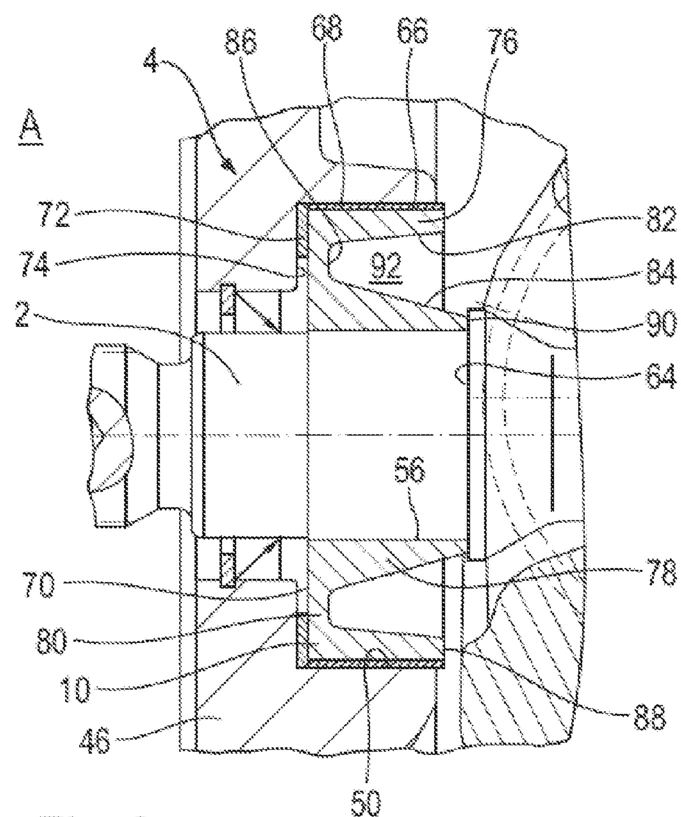
FIG. 2 shows an enlarged detail of the axial piston machine in FIG. 1 in the region of a sliding bearing.

FIG. 2 shows a detail A from FIG. 1. In addition to its inner annular surface 56, bearing element 10 has an outer, substantially circular-cylindrical annular surface 66. Bearing element 10 and hence the drive shaft 2 is supported by said surface in a sliding manner in the radial direction in a bearing bush 68 of sliding bearing 4. In this case, the bearing bush 68 is inserted securely in the bearing recess 50 in the pot-shaped housing part 46 and projects somewhat from the bearing recess 50 at the end. A width of the bearing bush 68 in the longitudinal direction corresponds approximately to a width of the outer annular surface 66. The width of the outer annular surface 66 is less than a width of the inner annular surface 56. A face 70 of bearing element 10 which faces away from the annular face 64 of the drive shaft 2 is formed in a circular ring between the outer and inner annular surfaces 66 and 56 of bearing element 10 and extends substantially perpendicularly to the longitudinal axis of the drive shaft 2. Bearing element 10 is supported by face 70 in a sliding manner in an axial direction, with the face 70 being against a thrust washer 72. Said washer rests on a bore bottom 74 of the bearing recess 50. Said bottom has an annular surface. The washer has approximately an outside diameter which corresponds to the outside diameter of the bearing recess 50, the thrust washer 72 is thus fixed on the bore bottom 74 in the longitudinal direction by the bearing bush 68.

The outer annular surface 66 forms an outer surface of a sleeve-shaped outer section 76 of bearing element 10, while the inner annular surface 56 forms an inner surface of a sleeve-shaped inner section 78 of bearing element 10. The outer and inner sections 76 and 78 are connected by a ring-shaped supporting web 80. The sections 76 and 78 and the supporting web 80 are formed integrally and form the face 70 of bearing element 10. The outer section 76 has a frustoconical inner circumferential surface 82, which tapers towards the face 70 of bearing element 10 and towards the supporting web 80. As a result, the outer section 76 in turn widens towards the supporting web 80. The inner section 78 likewise has a frustoconical inner circumferential surface 84, which tapers in a direction away from the supporting web 80. As a result, like the outer section 76, the inner section 78 likewise widens towards the supporting web 80. The two inner circumferential surfaces 82 and 84 end approximately at the same level on the side adjacent to the supporting web 80, when viewed in the longitudinal direction. Between the inner circumferential surfaces 82 and 84, the supporting web 80 is bounded by an annular surface 86, which faces away from the face 70 of bearing element 10 and extends approximately parallel to the face 70. A width of the supporting web 80 corresponds approximately to 15% of a width of the outer section 76—when viewed in the longitudinal direction. The outer section 76 furthermore has an annular face 88 facing away from face 70. The inner section 78 likewise has an annular face 90, which faces away from face 70 and via which bearing element 10 is supported on the annular face 64 of the drive shaft 2. The annular face 90 of the inner section 78 is further away from face 70 than the annular face 88. When viewed in a radial direction, the inner section 78 is wider in the region of the supporting web 80 than the outer section 76, while a width in a radial plane in which the annular face 88 of the outer section 76 approximately lies is approximately equal both in the case of the outer section 76 and the inner section 78. The supporting web 80 and sections 76 and 78 of bearing element 10 are thus formed by a recess 92 which is introduced into the end of bearing element 10. The recess 92 has an approximately V-shaped cross section.

Figure 3:
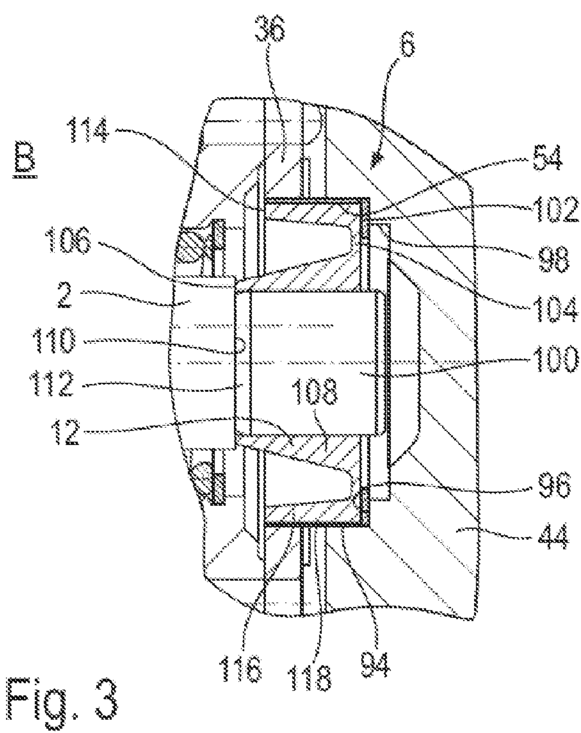
FIG. 3 shows an enlarged detail of the axial piston machine in FIG. 1 in the region of a different sliding bearing.

FIG. 3 shows an enlarged detail B of the hydraulic machine in FIG. 1, which has sliding bearing 6. This corresponds substantially to sliding bearing 4 in FIG. 2. In contrast to sliding bearing 4, sliding bearing 6 is arranged rotated by about 180° about the transverse axis thereof in the machine housing 8 shown in FIG. 1 and has a smaller configuration. A bearing bush 94 of sliding bearing 6 is inserted into the bearing recess 54 in the housing cover 44 and the control plate 36. A recess bottom 96 of the bearing recess 54 is penetrated in the direction of the center line thereof by a blind bore 98 and is therefore ring-shaped. An end section 100 of the drive shaft 2 projects into said bore. A thrust washer 102 rests on the recess bottom 96. Both the thrust washer 72 of sliding bearing 4 and the thrust washer 102 of sliding bearing 6 extend approximately from an inner circumferential surface of the bearing recesses 50 and 54 approximately as far as the supporting webs 80 and 104 of bearing elements 10 and 12, respectively. The width of the supporting web 80 of the bearing element 10 in FIG. 2 in the longitudinal direction is approximately twice that of the thrust washer 72, while the width of the supporting web 104 of the bearing element 12 in FIG. 3 corresponds approximately to the width of the thrust washer 102. An annular face 106 of an inner section 108 of bearing element 12 rests substantially on an annular face 110 formed by a step on the drive shaft 2. In the region of the annular face 110, the drive shaft 2 has an undercut 112. A distance as seen in the longitudinal direction between the annular face 106 of the inner section 108 and an annular face 114 of an outer section 116 of bearing element 12 is greater than the distance between these faces in the case of the bearing element 10 in FIG. 2, despite the smaller size of the bearing element 12 in FIG. 3.

The outside diameters of the bearing elements 10 and 12 in FIGS. 2 and 3 are in each case greater than a maximum outside diameter of the drive shaft 2.

During the use of the drive shaft 2, it is subjected to asymmetric loads by the drive mechanism 48, leading to deflection of the shaft. This deflection is substantially compensated for by the sliding bearings 4 and 6 with their elastic bearing elements 10 and 12 respectively. In the event of deflection of the drive shaft 2, the inner sections 78 and 108 of bearing elements 10 and 12 accompany this movement and act as a kind of lever on the supporting webs 80 and 104, respectively, giving rise to high stresses in this region which lead to an elastic deformation of bearing elements 10 and 12 in the region of their supporting webs 80 and 104 respectively. Due to the elastic deformations in the region of the supporting webs 80 and 104 of bearing elements 10 and 12, the outer sections 76 and 116 substantially retain their geometry shown in the figures and, as a result, the annular surface 66 of bearing element 10 continues to be guided substantially in contact in bearing bush 68 in the radial direction and an annular surface 118 of bearing element 12 continues to be guided substantially in contact in bearing bush 94 in the radial direction. Due to the wide construction of the inner sections 78 and 108 of bearing elements 10 and 12, the forces acting on the inner annular surface are smaller than in the case of shorter inner sections.

Due to the arrangement of the thrust washers 72 and 102 in the region of the outer sections 76 and 116 of bearing elements 10 and 12, respectively, there is virtually no effect on the axial support of the drive shaft 2 in the event of elastic deformation in the region of the supporting webs 80 and 104 since the outer sections 76 and 116 substantially retain their geometry shown in the figures.

In addition to deflection of the drive shaft 2, it is also possible to compensate for an alignment error of sliding bearings 4 and 6.

Since the annular surfaces 66 and 118 of the sliding bearings 4 and 6 in FIGS. 2 and 3, respectively, said annular surfaces being used as a sliding surface for the drive shaft 2, are spaced apart from the drive shaft 2, an angular velocity is comparatively high and, as a result, static friction and mixed friction is overcome at a comparatively low speed of the drive shaft 2 in the case of hydrodynamic sliding support between annular surface 66 and bearing bush 68 and annular surface 118 and bearing bush 94.

Figure 4:
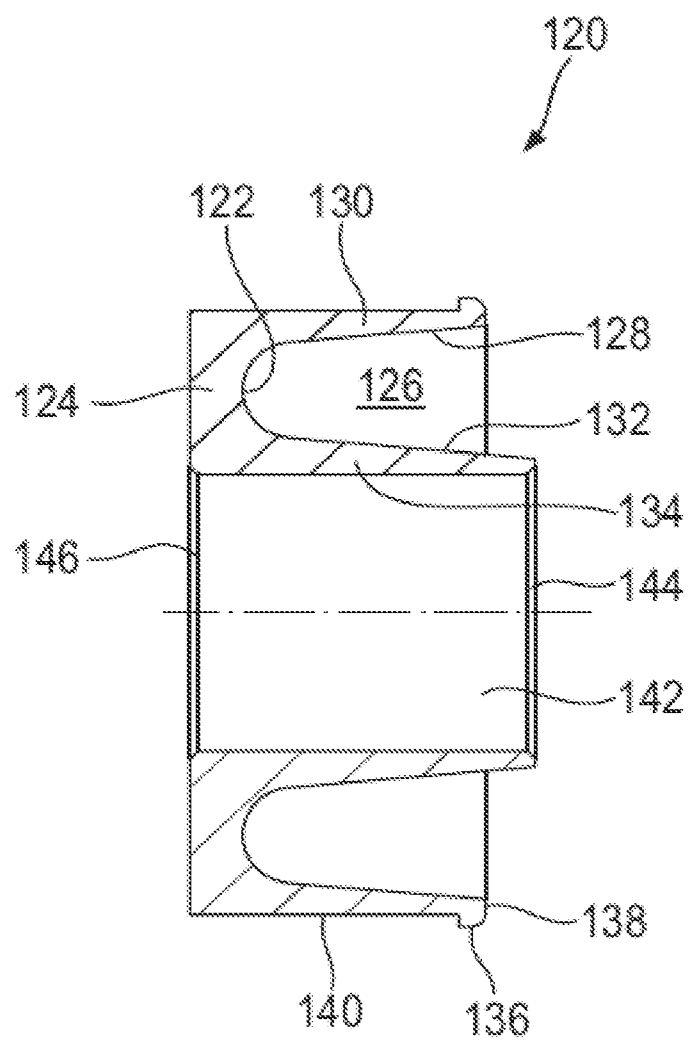
FIG. 4 shows a bearing element in accordance with a second illustrative embodiment in a longitudinal section.

In FIG. 4, a bearing element 120 in accordance with a second illustrative embodiment is shown in a longitudinal section. In contrast to the bearing elements 10, 12 in the figures described above, an annular surface 122 of a supporting web 124 within the recess 126 does not have substantially planar configuration but is concave. In this case, a cross section of the annular surface 122 extends approximately along a semicircle. In contrast to the embodiment explained above, the set angle of an inner circumferential surface 128 of an outer section 130 and that of an inner circumferential surface 132 of an inner section 134 are substantially the same.

A radial projection 136 is formed on the outer section 130 of the bearing element 120. This projection extends from an end section of the outer section 130, said end section having an annular face 138. In the installed condition of the bearing element 120, the radial projection 136 serves to axially retain a bearing bush. The bearing element 120 thus slides within the bearing bush via its annular surface 140, while the radial projection 136 can rest against a face of the bearing bush. The inner section 134 has a ring-shaped chamfer 144, 146 on each of its radially inner edges.

Figure 5:
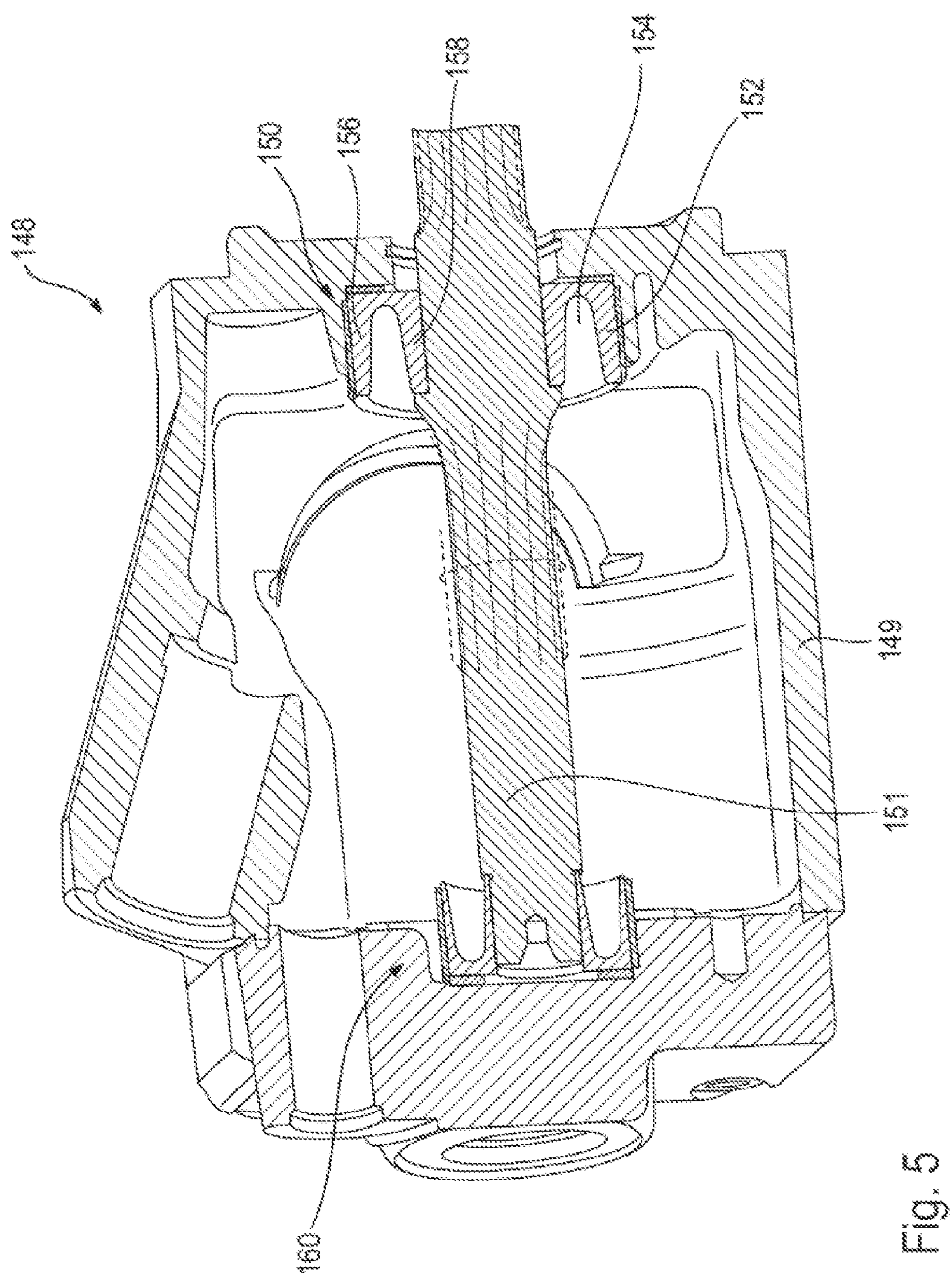
FIG. 5 shows a longitudinal section through an axial piston machine having sliding bearings in a simplified perspective representation.

FIG. 5 shows a longitudinal section of a hydraulic machine 148 in accordance with another embodiment in a highly simplified form and in a perspective view. Here, a machine housing 149, through which a drive shaft 151 provided with sliding support passes, is illustrated. In contrast to the previous embodiments, the larger sliding bearing 150, which is on the right in FIG. 5, has a bearing element 152 with a recess 154 which is configured such that an outer section 156 and an inner section 158 have an approximately mirror-symmetrical cross-sectional area and, as a result, a width of the sections 156 and 158 is also substantially the same when viewed in the longitudinal direction. The sliding bearing 160 on the left in FIG. 5 has a corresponding configuration to sliding bearing 150 but is smaller overall.

A bearing element for a sliding bearing configured to support a drive shaft of a hydraulic machine is disclosed. The bearing element is connected to the drive shaft so as to prevent relative rotation and has an outer annular surface to provide sliding support. A supporting web is formed between a location at which the bearing element is fixed to the drive shaft 2 and the outer annular surface. The supporting web is elastically deformable to compensate for deflection of the drive shaft and/or an alignment error of sliding bearings of the drive shaft. Moreover, a sliding bearing having a bearing element of this kind and a hydraulic machine having at least one sliding bearing of this kind are disclosed.

What is claimed is:

1. A bearing element for a rotating drive shaft comprising:
an inner annular surface configured to be coupled to the drive shaft to prevent relative rotation;
a supporting web configured to deform elastically; and
an outer annular surface coupled to the inner annular surface by the supporting web, the outer annular surface configured to provide a radial sliding surface and to slide circumferentially in a bearing receptacle,
wherein the inner annular surface and the outer annular surface each have a corresponding radial thickness at the supporting web and the supporting web has an annular thickness that is less than each corresponding radial thickness.

2. The bearing element of claim 1, wherein:
the supporting web is ring-shaped; and
the inner annular surfaces and the outer annular surfaces are cylindrical.

3. The bearing element of claim 1, wherein:
the bearing element is integrally formed; and
the supporting web is formed by an annular recess in an end of the bearing element between the inner annular surface and the outer annular surface.

4. The bearing element of claim 3, further comprising a face which faces away from the annular recess and is configured to provide an axial sliding surface.

5. The bearing element of claim 3, wherein:
the annular recess has an approximately frustoconical cross section in a section plane extending approximately along a longitudinal axis; and
the cross section tapers toward a face which faces away from the annular recess.

6. The bearing element of claim 4, wherein:
the annular recess forms a sleeve-shaped outer section which includes the outer annular surface; and
the axial sliding surface is an approximately circular ring-shaped surface section extending substantially in a region of the sleeve-shaped outer section.

7. The bearing element of claim 6, further comprising:
a radial projection formed on the outer annular surface; and
a bearing bush, the radial projection configured to support the bearing bush.

8. The bearing element of claim 7, wherein the radial projection is formed in a region of an annular face of the sleeve-shaped outer section.

9. The bearing element of claim 3, further comprising an inner annular face on the drive shaft formed by the annular recess, the inner annular face configured to support the bearing element in an axial direction.

10. The bearing element of claim 4, wherein the face extends substantially perpendicularly to an axial direction.

11. The bearing element of claim 1, wherein the inner annular surface is wider in an axial direction than the outer annular surface.

12. A sliding bearing comprising:
a bearing element integrally formed with;
an inner annular surface coupled to the drive shaft to prevent relative rotation;
a supporting web configured to deform elastically; and
an outer annular surface coupled to the inner annular surface by the supporting web, the outer annular surface configured to provide a radial sliding surface and to slide circumferentially in a bearing receptacle,
wherein the supporting web is formed by an annular recess in an end of the bearing element between the inner annular surface and the outer annular surface.

13. A hydraulic machine comprising:
a machine housing;
a drive shaft supported in the machine housing by at least one sliding bearing, the at least one sliding bearing comprising:
a bearing element integrally formed with;
an inner annular surface coupled to the drive shaft to prevent relative rotation;
a supporting web configured to deform elastically; and
an outer annular surface coupled to the inner annular surface by the supporting web, the outer annular surface configured to provide a radial sliding surface and to slide circumferentially in a bearing receptacle,
wherein the supporting web is formed by an annular recess in an end of the bearing element between the inner annular surface and the outer annular surface.

14. The hydraulic machine of claim 13, further comprising:
a bearing recess in the machine housing, the bearing recess having a recess bottom;
a bearing bush arranged in the bearing recess; and
a thrust washer configured to provide an axial sliding surface, the thrust washer arranged on the recess bottom.

15. The hydraulic machine of claim 13, wherein:
the drive shaft is supported by two sliding bearings; and
a drive mechanism is arranged substantially between the sliding bearings.

* * * * *